United States Patent [19]

Hildebrand et al.

[11] 4,391,523
[45] Jul. 5, 1983

[54] SCANNABLE DETECTOR SYSTEM FOR ECHELLE GRATING SPECTROMETERS

[75] Inventors: Karl J. Hildebrand, Tyngsboro; John Leeman, Andover, both of Mass.

[73] Assignee: Leeman Labs Inc., Tewksbury, Mass.

[21] Appl. No.: 246,716

[22] Filed: Mar. 23, 1981

Related U.S. Application Data

[63] Continuation-in-part of Ser. No. 206,445, Nov. 13, 1980, abandoned.

[51] Int. Cl.³ ............................. G01J 3/34; G01J 3/38
[52] U.S. Cl. ...................................... 356/328; 356/306
[58] Field of Search ............... 356/306, 307, 308, 326, 356/328, 332, 334

[56] References Cited

U.S. PATENT DOCUMENTS

| | | | |
|---|---|---|---|
| 1,727,173 | 9/1929 | Müller | 356/302 |
| 2,572,119 | 10/1951 | Dieke | 356/303 X |
| 2,686,894 | 8/1954 | Mathieu | 356/373 X |
| 3,829,218 | 8/1974 | Alyanak | 356/326 |
| 4,049,353 | 9/1977 | Missio | 356/326 X |
| 4,279,511 | 7/1981 | Maute et al. | 356/334 X |

*Primary Examiner*—F. L. Evans
*Attorney, Agent, or Firm*—John M. Brandt

[57] ABSTRACT

A scannable detector system for echelle grating spectrometers is disclosed in which a photodetector is positioned behind an aperture plate having a plurality of apertures corresponding to focal positions of the spectral array eminating from the grating. The detector is arranged to scan from aperture to aperture to measure the presence of individual wavelengths in the array. Additionally, the detector may be removed from the field of the plate to permit the substitution of a nonscannable array of detectors and an associated masking aperture plate to simultaneously measure the presence of a plurality of wavelengths in the spectral array.

4 Claims, 2 Drawing Figures

SCANNABLE DETECTOR SYSTEM FOR ECHELLE GRATING SPECTROMETERS

CROSS REFERENCE TO RELATED APPLICATIONS

This application is a continuation-in-part of Ser. No. 06/206,445 filed Nov. 13, 1980 by the same inventors, now abandoned.

BACKGROUND OF THE INVENTION

1. Field of the Invention:

The invention resides in the field of spectrometers and is more particularly related to detector systems for echelle grating spectrometers.

2. Description of the Prior Art:

Detector systems for prior art spectrometers known to the inventors are of two types. Both employ detectors which are mechanically mounted in a fixed position. The first type consists of those in which a single detector is arranged to respond to various wavelengths as they are brought into the field of view of the detector by manipulation of the spectrometer grating, optical components within the spectrometer, or shifting apertures which sequentially block all but selected wavelengths.

Alternatively, a plurality of detectors are employed to simultaneously detect a plurality of wavelengths as determined by multiple aperture plate positioned to intercept a spectral array dispersed by a grating. The plate is necessarily limited to a selected number of apertures far less than the dispersing capability of the spectrometer. Such a system is shown in use with an echelle grating spectrometer in U.S. Pat. No. 4,049,353, Missio.

In contrast, the present invention employs a single scannable detector in conjunction with an aperture plate which may contain apertures corresponding to all of the wavelengths of interest. As a result, electronic and mechanical techniques may be used to perform selected patterns of sequential measurements by moving the detector rather than any of the optical components of the system. Additionally, the use of a single detector insures a continuous known uniform response to all wavelengths and greatly facilitates calibration of the system. Further, since the scannable detector is moveable by nature, it may be completely removed from the field of the aperture plate and an array of detectors with a masking aperture plate for multiple simultaneous measurements substituted therefore.

SUMMARY OF THE INVENTION

The invention may be summarized as a scannable detector system for echelle grating spectrometers in which a detector is arranged to move from focal position to focal position of the various wavelengths which comprise the spectral array eminating from the grating. The scan is preferably carried out in an X-Y pattern to match the well known echelle rectangular format. Screw drives activated by stepper motors may be used to obtain the required degree of accuracy.

To eliminate extraneous radiation, a main aperture plate having apertures corresponding to all of the wavelengths of interest is imposed between the detector and imaging means employed to focus the array in a plane. A lens possessing chromatic aberration is best suited to focus the array and to expand the field of the array as is described in the above identified co-pending application, which is hereby incorporated by reference. As is customary with echelle grating spectrometers, a cross dispersing order separating device such as a prism is placed between the grating and the lens.

The scannable detector may also be combined with a fixed composite of detectors which are substituted for the single detector by removing it from the field of the main aperture plate and inserting a second masking aperture plate over the main plate to limit the number of wavelengths reaching the multi-detector array. Simultaneous measurement of a selected number of wavelengths as determined by the configuration of the mask plate may then be carried out These and other features of the invention will become more evident from the description of the preferred embodiment and drawings which follow.

DESCRIPTION OF THE PREFERRED EMBODIMENT

Figure 1:
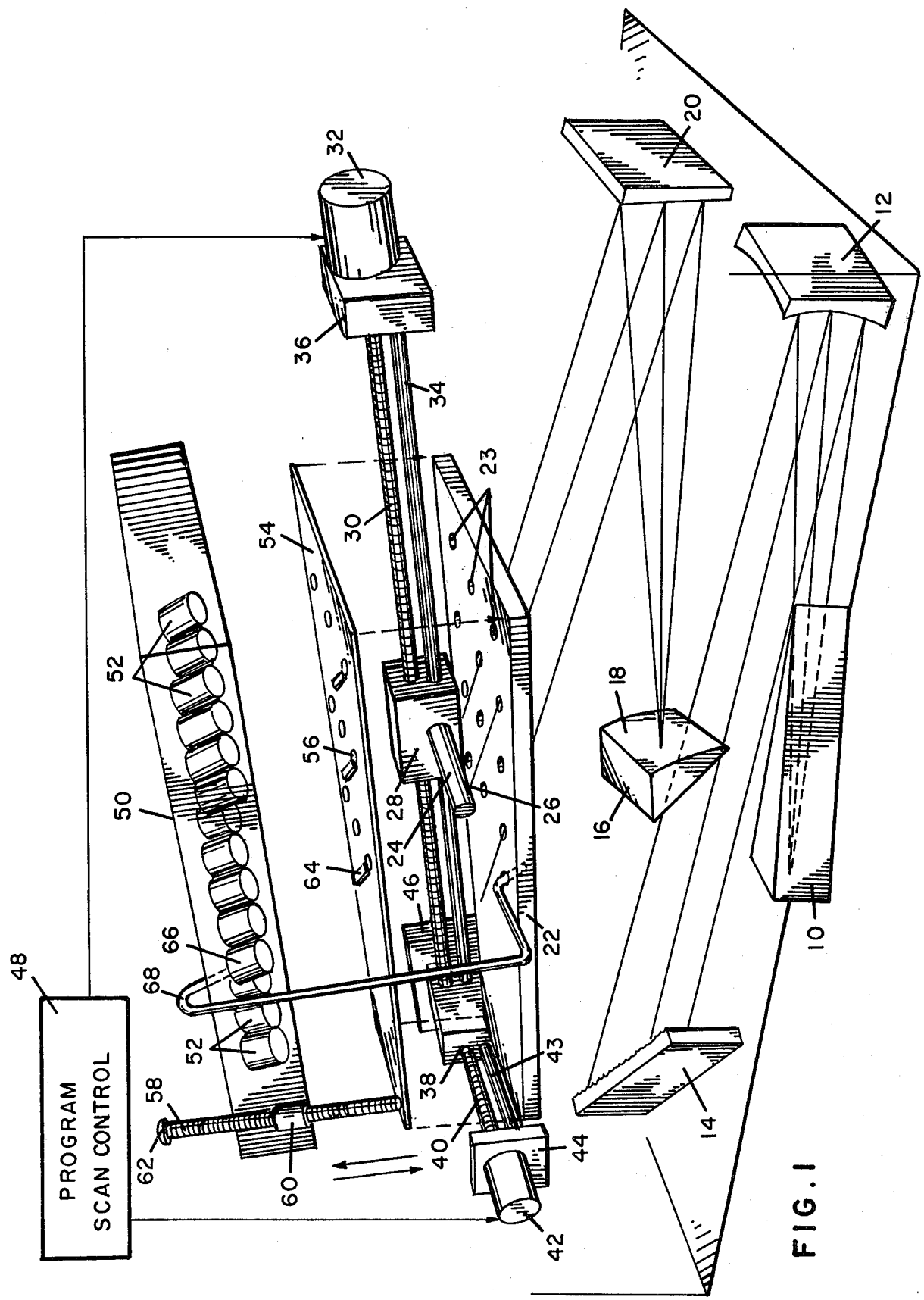
FIG. 1 is a perspective view of the preferred embodiment of the invention.

FIG. 1 is a perspective view of a spectrometer apparatus incorporating the preferred embodiment of the invention.

Spectral energy enters aperture 10 from a source not shown, is collimated by mirror 12 and reflected to echelle type diffraction grating 14. Grating 14 disperses the energy into a spectrum of overlapping orders which is then cross-dispersed by prism 16 to form a rectangular patterned spectral array of wavelength segments. Prism 16 has curved lens surface 18 formed upon its exit face, which lens surface is uncorrected for chromatic aberration. The effect of the lens is to bring the emerging wavelength segments to focus in a skewed plane formed at an oblique angle to the lens axis. The path of the spectral array emerging from the lens is folded and reflected by mirror 20 such that it implies on inclined aperture plate 22 positioned in the effective skewed focal plane of the lens.

Aperture plate 22 contains a large plurality of apertures 23 (approximately 200 to 300) corresponding to wavelengths of spectral interest. The plate serves to eliminate extraneous background radiation as well as to separate and define discrete beams of monochromatic energy which may then be measured by scanning detector 24 having entrance slit 26. Detector 24 is secured to mounting block 28 which is driven back and forth in the Y direction by lead screw 30 powered by motor 32. Mounting block 28 is further slideably supported by bearing rod 34 which, in addition to lead 30, is secured between end blocks 36 and 38.

This entire configuration is driven back and forth in the X direction by lead screw 40 interacting with end block 38 and powered by motor 42. End block 38 is further supported by bearing rod 43 which in addition to lead 40 is secured between assembly mounts 44 and 46.

Motors 32 and 42 are activated by control 48 which may consist of any well known means to advance the motors in a programmed manner to direct the scanner to a particular aperture corresponding to a selected wavelength.

Figure 2:
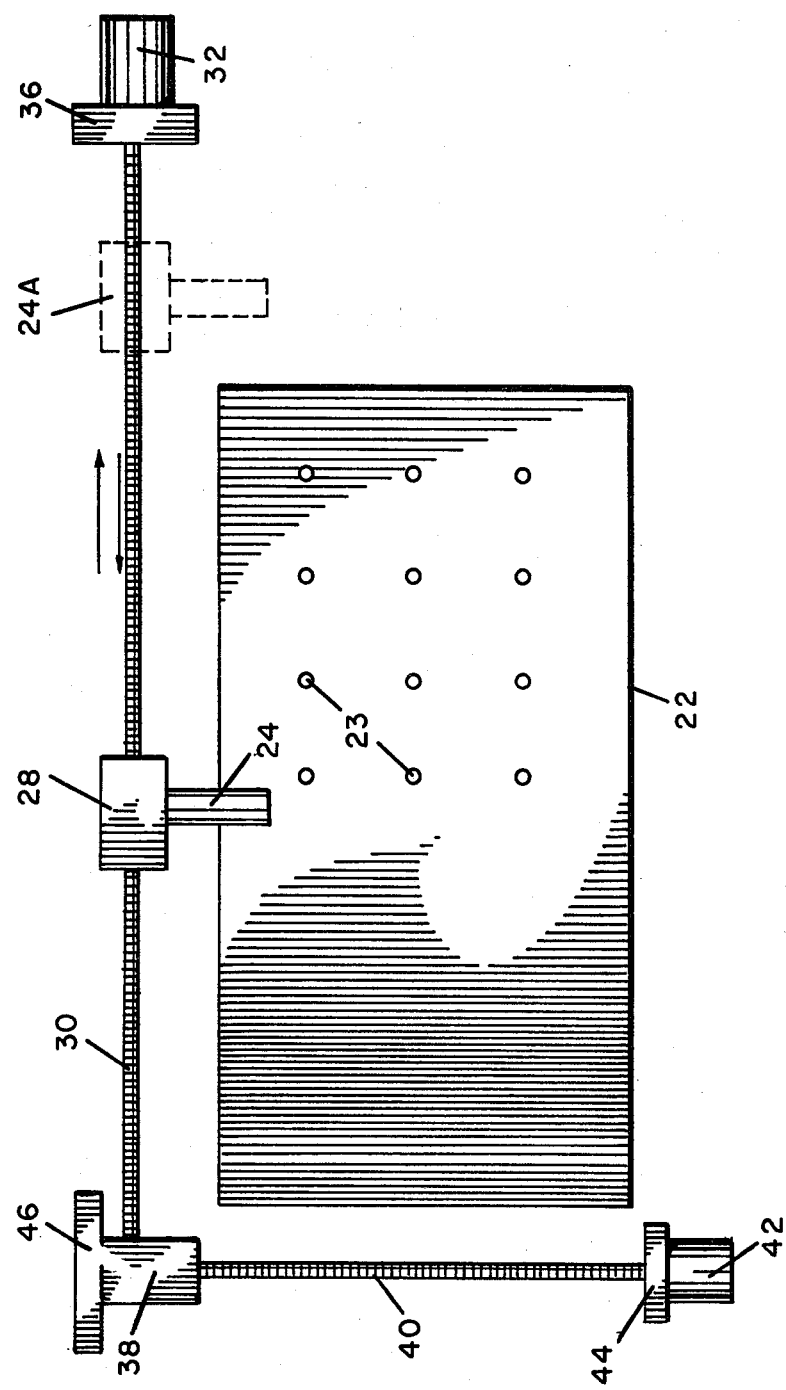
FIG. 2 is a top view of a portion of the apparatus of FIG. 1.

While the scannable detector is suited for sequential wavelength measurement, it is often desirable to perform a plurality of these measurements simultaneously. Such a capability is particularly useful when only small amounts of sample are available and are consumed quickly during excitation. To this end, multiple detector array assembly 50 is provided having individual detectors 52. The scannable system is arranged to allow complete removal of detector 24 from the field of aperture plate 22 by, for example, rotating lead screw 30 to place detector 24 in a position 24A shown in dashed line format in FIG. 2.

Masking aperture plate 54 having a limited number of apertures 56 relating to a selected measurement routine is slideably mounted to descend into close proximity to main plate 22. This may be accomplished in a variety of ways such as the use of a plurality of rods 58 (one of which is shown) attached to plate 54 and slideably mounted in sleeves 60 attached to array assembly 50. Stops 62 regulate the extend of travel of plate 54. Mirrors 64 reflect radiation to detectors 52, each of which responds with an electrical output proportional to intensity in a similar manner to the operation of detector 24.

The spectrometric apparatus described herein also allows the addition of a fixed standardization detector which is made possible by the static grating and optical system which produces the array. To calibrate the apparatus on a continuing basis, a standardization material of known concentration, such as Germanium, may be added to the unknown sample. By monitoring a characteristic excitation wavelength of this material, the system response can be normalized to eliminate internal fluctuations. This is accomplished by the inclusion of detector 66 which is removed from the field of plate 22 so as not to interfere with the movement of scanning detector 24. The particular wavelength of interest is routed to te detector by optical transfer means such as a fine fiber optic light pipe 68. Other means such as a reflecting mirror might also be employed for the same purpose.

What is claimed is:

1. A scannable detector system for echelle grating spectrometric comprising in combination:

a. an echelle diffraction grating for separating radiation input energy into a spectrum of mixed orders;
   b. optical dispersing means for further separating said orders into a spectral array of discrete monochromatic wavelength segments;
   c. imaging means to image said spectral array in a focal plane;
   d. a first aperture plate positioned in said focal plane, said plate having a plurality of apertures corresponding to focal positions of said segments of said array;
   e. at least one scannable photodetector positioned behind said plate to receive and sense any of said wavelength segments transmitted by said plate;
   f. means to scan said detector from aperture to aperture to measure individual wavelength segments in a selected sequence;
   g. a photodetector array mounted behind said first aperture plate;
   h. means to remove said scannable detector from the field of said plate;
   i. a second masking aperture plate having fewer apertures than said first aperture plate; and
   j. mounting means for mounting said second aperture plate between said photodetector array and said first aperture plate, said mounting means arranged such that said apertures in said second plate align with said apertures in said first plate.

2. The apparatus of claim 1 wherein said mounting means for said second aperture plate comprises slide means to raise and lower said second plate between said first plate and said detector array.

3. The apparatus of claim 2 wherein said slide means comprises a plurality of sleeves attached to said array and an equivalent plurality of rods slideably positioned in said sleeves and attached to said second aperture plate.

4. The apparatus of claim 1, 2, or 3 wherein said imaging means comprises a lens possessing chromatic aberration and said focal plane forms an oblique angle with the axis of said lens.

* * * * *